US012647139B2

(12) United States Patent
Kani

(10) Patent No.: US 12,647,139 B2
(45) Date of Patent: Jun. 2, 2026

(54) RADIO-FREQUENCY MODULE AND COMMUNICATION DEVICE

(71) Applicant: Murata Manufacturing Co., Ltd., Nagaokakyo (JP)

(72) Inventor: Hiroyuki Kani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 303 days.

(21) Appl. No.: 18/624,566

(22) Filed: Apr. 2, 2024

(65) Prior Publication Data

US 2024/0421835 A1 Dec. 19, 2024

(30) Foreign Application Priority Data

Jun. 15, 2023 (JP) ................................. 2023-098567

(51) Int. Cl.
*H04B 1/00* (2006.01)
*H04B 1/04* (2006.01)
(52) U.S. Cl.
CPC ......... *H04B 1/0078* (2013.01); *H04B 1/0096* (2013.01); *H04B 1/0483* (2013.01); *H04B 2001/0408* (2013.01); *H04B 2001/0491* (2013.01)
(58) Field of Classification Search
CPC .. H04B 1/0078; H04B 1/0096; H04B 1/0483; H04B 2001/0408; H04B 2001/0491; H04B 1/0057; H04B 1/006; H04B 1/1027; H04B 1/109; H04B 2001/1063; H03F 1/26; H03F 3/19; H03F 3/21; H03F 2200/294;

(Continued)

(56) References Cited

U.S. PATENT DOCUMENTS 11,418,224 B2 * 8/2022 Nakajima ................. H03F 1/56
11,700,027 B2 * 7/2023 Gorbachov ............... H03F 3/24
455/78

(Continued)

FOREIGN PATENT DOCUMENTS

JP      S62-006502 A      1/1987
JP      H04-297107 A      10/1992

(Continued)

OTHER PUBLICATIONS

International Search Report and Written Opinion mailed on Nov. 15, 2022, received for PCT Application PCT/JP2022/035209, filed on Sep. 21, 2022, 9 pages including English Translation.

*Primary Examiner* — Md K Talukder
(74) *Attorney, Agent, or Firm* — XSENSUS LLP

(57) ABSTRACT

A radio-frequency module includes a first switch, a first filter, second filters, a power amplifier, and a low-noise amplifier. The first switch has a first terminal, a second terminal, and a third terminal. The first terminal is coupled to an antenna terminal. The first filter is coupled to the second terminal. The second filters are coupled to the third terminal. The first filter includes a common filter circuit and an additional filter circuit. The additional filter circuit is coupled between the power amplifier and the common filter circuit. The low-noise amplifier is coupled to a path that branches off from a path connecting between the common filter circuit and the additional filter circuit. The common filter circuit is coupled between the additional filter circuit and the first switch.

20 Claims, 4 Drawing Sheets

(58) Field of Classification Search
  CPC .. H03F 2200/451; H03H 7/12; H03H 11/344;
                H04L 5/06; H04L 5/1415
  See application file for complete search history.

(56) References Cited

U.S. PATENT DOCUMENTS

| | | | | |
|---|---|---|---|---|
| 2013/0273861 | A1* | 10/2013 | See | H04B 1/44 |
| | | | | 455/83 |
| 2017/0094608 | A1* | 3/2017 | Langer | H04B 1/0057 |
| 2018/0062693 | A1* | 3/2018 | Jung | H04B 1/48 |
| 2020/0412403 | A1* | 12/2020 | Pehlke | H04L 5/14 |
| 2021/0351800 | A1* | 11/2021 | Takayanagi | H04B 1/0057 |
| 2022/0021357 | A1* | 1/2022 | Takeuchi | H04B 1/40 |
| 2022/0052670 | A1* | 2/2022 | Matsumoto | H03F 3/245 |
| 2022/0200690 | A1* | 6/2022 | Jacob | H04B 7/024 |
| 2023/0017570 | A1* | 1/2023 | Nakajima | H03F 1/565 |
| 2024/0421835 | A1* | 12/2024 | Kani | H04B 1/0483 |
| 2025/0279794 | A1* | 9/2025 | Pu | H04B 1/0057 |

FOREIGN PATENT DOCUMENTS

| | | | |
|---|---|---|---|
| JP | H07-106847 | A | 4/1995 |
| JP | 2745844 | B2 | 4/1998 |
| JP | 3082226 | B2 | 8/2000 |
| JP | 2002-185237 | A | 6/2002 |
| JP | 2012-151671 | A | 8/2012 |
| JP | 2014-027500 | A | 2/2014 |

* cited by examiner

RADIO-FREQUENCY MODULE AND COMMUNICATION DEVICE

CROSS-REFERENCE TO RELATED APPLICATION

This application claims the benefit of priority to Japanese application no. 2023-098567, filed Jun. 15, 2023, the entire contents of which are hereby incorporated by reference.

BACKGROUND

1. Field

The present disclosure relates to radio-frequency modules and communication devices. More specifically, the present disclosure relates to a radio-frequency module capable of simultaneously performing first communication using a first communication band and second communication using a second communication band, and a communication device including the radio-frequency module.

2. Description of the Related Art

A conventional filter device includes a switch and a first filter. The switch has a common terminal, a first selection terminal, and a second selection terminal. The first filter includes a filter circuit (common filter section) and a series arm resonator (additional filter section). The filter circuit is coupled to one end of the series arm resonator. The first selection terminal is coupled between the one end of the series arm resonator and the filter circuit. The second selection terminal is coupled to the other end of the series arm resonator.

SUMMARY

In the conventional filter device, when an antenna terminal is coupled to the common terminal of the switch (in other words, when the switch serves as an antenna switch), the additional filter circuit is coupled between the antenna switch and the common filter circuit. In this case, when both the common filter circuit and the additional filter circuit are used for communication, the additional filter circuit serves as a resonator at the antenna switch side end of the first filter. By contrast, when only the common filter circuit is used for communication, a resonator at the antenna switch side end of the common filter circuit serves as the resonator at the antenna switch side end of the first filter. As such, the configuration of the resonator at the antenna switch side end of the first filter varies between when communication is performed using both the common filter circuit and the additional filter circuit and when communication is performed using only the common filter circuit. As a result, the impedance on the first filter side as observed from the first switch varies between when communication is performed using both the common filter circuit and the additional filter circuit and when communication is performed using only the common filter circuit.

Here, another filter is additionally coupled to the antenna terminal together with the filter device. The pass band of the filter device is a first communication band, and the pass band of the other filter is a second communication band. With this configuration, the following scenario can be considered: simultaneous communications using both the filter device and the other filter are performed, while the filter device alternately performs communication using both the common filter section and the additional filter circuit and communication using only the common filter circuit. In this scenario, a problem arises in which signals passing through the other filter may vary with the state of the filter device, because the signals are susceptible to the influence of the filter device.

The present disclosure has been made in consideration of the above problem, and at least one object thereof is to provide a radio-frequency module and a communication device that enable simultaneous communications using a first filter and a second filter for time division duplex with reduced amounts of variation in the bandpass phase of the second filter due to the state of the first filter.

A radio-frequency module according to an aspect of the present disclosure is configured to simultaneously perform first communication using a first communication band and second communication using a second communication band. The radio-frequency module includes a first switch, a first filter, a second filter, a power amplifier, and a low-noise amplifier. The first switch has a first terminal, a second terminal, and a third terminal. The first terminal is coupled to an antenna terminal. The second terminal and the third terminal are configured to be connected to or disconnected from the first terminal in a switchable manner. The first filter is coupled to the second terminal. The first filter has a pass band that includes the first communication band. The second filter is coupled to the third terminal. The second filter has a pass band that includes the second communication band. The first filter includes a common filter section and an additional filter section. The common filter section is configured for both transmission and reception. The common filter circuit is configured to pass a transmit signal and a receive signal in time division duplex. The additional filter circuit is configured for either transmission or reception. The additional filter circuit is coupled between a first amplifier and the common filter circuit, and the first amplifier is one of the power amplifier and the low-noise amplifier. A second amplifier is another of the power amplifier and the low-noise amplifier, and the second amplifier is coupled to a second signal path that branches off from a first signal path connecting between the common filter circuit and the additional filter circuit. The common filter circuit is coupled between the additional filter circuit and the first switch.

A communication device according to an aspect of the present disclosure includes the radio-frequency module described above and a signal processing circuit. The signal processing circuit is coupled to the radio-frequency module. The signal processing circuit is configured to process a radio-frequency signal.

The radio-frequency module and communication device according to the present disclosure have an advantage in which simultaneous communications using a first filter and a second filter for time division duplex are enabled with reduced amounts of variation in the bandpass phase of the second filter due to the state of the first filter.

DESCRIPTION OF THE PREFERRED EMBODIMENTS

First Exemplary Embodiment

Hereinafter, a communication device 100 including a radio-frequency module according to a first exemplary embodiment will be described in detail with reference to the drawings.

1. Outline

Figure 1:
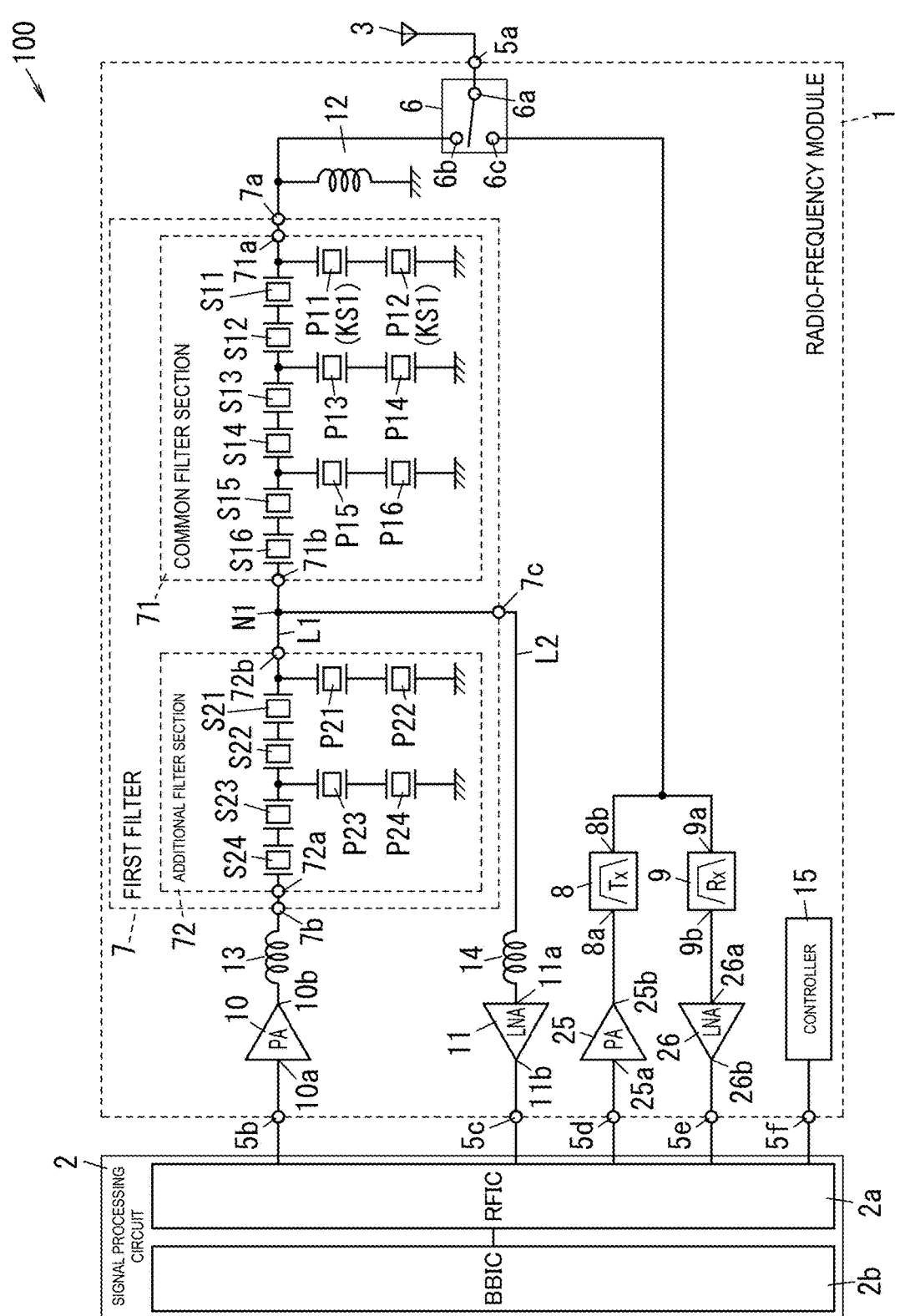
FIG. 1 illustrates a configuration of a radio-frequency module and a communication device according to a first exemplary embodiment.

As illustrated in FIG. 1, a radio-frequency module 1 according to the first exemplary embodiment is capable of simultaneously perform first communication using a first communication band and second communication using a second communication band. The radio-frequency module 1 includes a first switch 6, a first filter 7, second filters 8 and 9, a power amplifier 10 (a first amplifier), and a low-noise amplifier 11 (a second amplifier). The first switch 6 has a first terminal 6a, a second terminal 6b, and a third terminal 6c. The first terminal 6a is coupled to an antenna terminal 5a. The second terminal 6b and the third terminal 6c can be connected to or disconnected from the first terminal 6a in a switchable manner. The first filter 7 is coupled to the second terminal 6b. The first filter 7 has a pass band that includes the first communication band. The second filters 8 and 9 are coupled to the third terminal 6c. The second filters 8 and 9 have pass bands that include the second communication band. The first filter 7 includes a common filter section 71 and an additional filter section 72. The common filter section 71 can be used for both transmission and reception. Transmit signals and receive signals can pass through the common filter section 71 in time division duplex (TDD). The additional filter section 72 can be used for either transmission or reception. The additional filter section 72 is coupled between the first amplifier (the power amplifier 10 in FIG. 1), which is one of the power amplifier 10 and the low-noise amplifier 11, and the common filter section 71. The second amplifier (the low-noise amplifier 11 in FIG. 1), which is the other of the power amplifier 10 and the low-noise amplifier 11, is coupled to a second signal path L2. The second signal path L2 branches off from a first signal path L1 connecting between the common filter section 71 and the additional filter section 72. The common filter section 71 is coupled between the additional filter section 72 and the first switch 6.

In this configuration, the common filter section 71 is coupled between the additional filter section 72 and the first switch 6. As a result, an identical resonator at the first switch 6 side end of the first filter 7 (in other words, the first switch 6 side end of the common filter section 71) can be used for both transmission operation and reception operation in TDD using the first filter 7. This configuration reduces impedance variations in the first filter 7 between transmission operation and reception operation in TDD using the first filter 7, when observed from the second filters 8 and 9 side. Considering the case where the first communication using the first filter 7 and the second communication using the second filters 8 and 9 are simultaneously performed, the variation in the phase of the signals passing through the second filters 8 and 9 (signals in the second communication band) between transmission operation and reception operation in TDD using the first filter 7 can be reduced. In other words, during simultaneous communications using the first filter 7 and the second filters 8 and 9, the amount of variation in the bandpass phase of the second filters 8 and 9 due to the state of the first filter 7 can be reduced.

2. Configuration of Communication Device

As illustrated in FIG. 1, the communication device 100 is a communication device including the radio-frequency module 1. The communication device 100 may be, for example, a mobile terminal (for example, a smartphone). The communication device 100 is not limited to this example and may be a wearable device (for example, a smartwatch). The radio-frequency module 1 can support, for example, the fourth generation (4G) and fifth generation (5G) technology standards for cellular networks. Examples of the 4G standards include the 3rd Generation Partnership Project (3GPP) (registered trademark) Long-Term Evolution (LTE) (registered trademark) standard. Examples of the 5G standards include 5G New Radio (NR).

As well as the radio-frequency module 1, the communication device 100 includes a signal processing circuit 2 and an antenna 3.

The radio-frequency module 1 is configured to amplify transmit signals (radio-frequency signals) outputted from the signal processing circuit 2 and transmit the amplified signals from the antenna 3 or to amplify receive signals (radio-frequency signals) received by the antenna 3 and output the amplified signals to the signal processing circuit 2. The radio-frequency module 1 can be controlled by, for example, the signal processing circuit 2.

The signal processing circuit 2 is coupled to the radio-frequency module 1. The signal processing circuit 2 is configured to process transmit signals to be output to the radio-frequency module 1 or to process receive signals outputted from the radio-frequency module 1. The signal processing circuit 2 includes a radio-frequency (RF) signal processing circuit 2a and a baseband signal processing circuit 2b.

The RF signal processing circuit 2a is, for example, a radio frequency integrated circuit (RFIC). The RF signal processing circuit 2a is operable to processes radio-frequency signals (transmit signals and receive signals). The RF signal processing circuit 2a processes, for example, by down-conversion, receive signals outputted from the radio-frequency module 1 and outputs the receive signals to the baseband signal processing circuit 2b. The RF signal processing circuit 2a also processes, for example, by up-conversion, transmit signals outputted from the baseband signal processing circuit 2b and outputs the transmit signals to the radio-frequency module 1.

The baseband signal processing circuit 2b is, for example, a baseband integrated circuit (BBIC). The baseband signal processing circuit 2b is configured to output receive signals outputted from the RF signal processing circuit 2a to outside. These output signals (receive signals) can be used as, for example, image signals for image display or sound signals for calls. The baseband signal processing circuit 2b is also configured to generate transmit signals from base band signals (for example, sound signals and image signals) inputted from outside and outputs the generated transmit signals to the RF signal processing circuit 2a.

3. Configuration of Radio-Frequency Module

As illustrated in FIG. 1, the radio-frequency module 1 includes multiple external terminals 5a to 5f, the first switch 6, the first filter 7, multiple (two in the example in FIG. 1)

second filters 8 and 9, power amplifiers 10 and 25, low-noise amplifiers 11 and 26, matching circuits 12 to 14, and a controller 15.

The external terminal 5a is an antenna terminal to which the antenna 3 is coupled. The external terminals 5b and 5d are input terminals coupled to an output (not illustrated) of the signal processing circuit 2, configured to receive transmit signals outputted from the output of the signal processing circuit 2. The external terminals 5c and 5e are output terminals coupled to an input (not illustrated) of the signal processing circuit 2, configured to output receive signals processed by the radio-frequency module 1 to the input of the signal processing circuit 2. The external terminal 5f is a signal input terminal coupled to a signal output (not illustrated) of the signal processing circuit 2, configured to receive control signals for controlling the controller 15 from the signal processing circuit 2. In the following description, the external terminal 5a is sometimes referred to as the antenna terminal 5a, the external terminal 5b as the input terminal 5b, and the external terminal 5c as the output terminal 5c. The external terminal 5d is sometimes referred to as the input terminal 5d, the external terminal 5e as the output terminal 5e, and the external terminal 5f as the signal input terminal 5f.

The first switch 6 is operable to couple the antenna 3 to at least either the first filter 7 or the second filters 8 and 9. The first switch 6 can be controlled by a control signal from the controller 15. The first switch 6 is, for example, a switch integrated circuit (IC). The first switch 6 has the first terminal 6a, the second terminal 6b, and the third terminal 6c. The first terminal 6a is a common terminal and can be selectively connected to the second terminal 6b or the third terminal 6c. The first terminal 6a is coupled to the antenna terminal 5a. The second terminal 6b and the third terminal 6c are, for example, selection terminals. The second terminal 6b and the third terminal 6c can be connected to or disconnected from the first terminal 6a in a switchable manner. The second terminal 6b is coupled to the first filter 7. The third terminal 6c is coupled to the second filters 8 and 9.

The first filter 7 is a transmit/receive filter having a pass band that includes the transmit/receive frequency range of the first communication band (for example, Band 41). The first filter 7 can be used for both transmission and reception. Transmit signals and receive signals can pass through the first filter 7 in TDD. The first filter 7 is coupled between the second terminal 6b of the first switch 6 and the power amplifier 10.

The first filter 7 includes an input/output 7a, an input 7b, an output 7c, the common filter section 71, and the additional filter section 72.

The input/output 7a is coupled to the second terminal 6b of the first switch 6 via the matching circuit 12. The input 7b is coupled to an output 10b of the power amplifier 10 via the matching circuit 13. The common filter section 71 and the additional filter section 72 are coupled in series between the input/output 7a and the input 7b. A node N1 is provided in the first signal path L1 connecting between the common filter section 71 and the additional filter section 72. The second signal path L2, which is coupled to an input 11a of the low-noise amplifier 11, branches off at the node N1. The output 7c serves as an output portion for current to flow from inside the first filter 7 to outside, after the current flows from the node N1 to the second signal path L2. The output 7c is provided at an intermediate point in the second signal path L2.

The common filter section 71 serves as a transmit/receive filter that can be used for both transmission and reception.

Transmit signals and receive signals can pass through the transmit/receive filter in TDD. The common filter section 71 has a pass band that includes the first communication band. The common filter section 71 is coupled between the input/output 7a and the output 7c of the first filter 7. In other words, the common filter section 71 is coupled between the additional filter section 72 and the second terminal 6b of the first switch 6. This means that in the signal path connecting between the power amplifier 10 and the second terminal 6b of the first switch 6, the common filter section 71 is provided at a location that is closer to the first switch 6 than the additional filter section 72 (in other words, the location closest to the first switch 6 in the first filter 7).

The common filter section 71 includes inputs/outputs 71a and 71b, multiple series arm resonators S11 to S16, and multiple parallel arm resonators P11 to P16. The input/output 71a is coupled to the input/output 7a of the first filter 7. The input/output 71b is coupled to the output 7c of the first filter 7. The series arm resonators S11 to S16 are coupled in series between the inputs/outputs 71a and 71b. In the example in FIG. 1, the series arm resonators S11 to S16 are coupled in series, from the input/output 71a side to the input/output 71b side, in this order. The parallel arm resonators P11 and P12 are coupled in series between the node between the input/output 71a and the series arm resonator S11 and ground. The parallel arm resonators P13 and P14 are coupled in series between the node between the series arm resonators S12 and S13 and ground. The parallel arm resonators P15 and P16 are coupled in series between the node between the series arm resonators S14 and S15 and ground.

When the first filter 7 is used for transmission, the common filter section 71 limits the transmit signals inputted to the input/output 71b to signals within the pass band that includes the first communication band and passes the signals by using the series arm resonators S11 to S16 and the parallel arm resonators P11 to P16. The common filter section 71 outputs the passed transmit signals from the input/output 71a. When the first filter 7 is used for reception, the common filter section 71 limits the receive signals inputted to the input/output 71a to signals within the pass band that includes the first communication band and passes the signals by using the series arm resonators S11 to S16 and the parallel arm resonators P11 to P16. The common filter section 71 outputs the passed receive signals from the input/output 71b.

In the example in FIG. 1, the common filter section 71 is configured such that the parallel arm resonators P11 and P12 serve as a resonator KS1 provided at the first switch 6 side end of the common filter section 71. The common filter section 71 may be configured such that series arm resonators serve as the resonator KS1.

The additional filter section 72 serves as a filter (for example, a transmit filter) that can be used for either transmission or reception (exclusively used for transmission in the first exemplary embodiment). The additional filter section 72 has a pass band that includes the first communication band. The additional filter section 72 is coupled between the input 7b and the output 7c of the first filter 7. In other words, the additional filter section 72 is coupled between the output 10b of the power amplifier 10 and the common filter section 71. The additional filter section 72 is not provided in the second signal path L2 (a receive path) that connects the common filter section 71 to the low-noise amplifier 11.

The additional filter section 72 includes an input 72a, an output 72b, multiple series arm resonators S21 to S24, and multiple parallel arm resonators P21 to P24. The input 72*a* is coupled to the input 7*b* of the first filter 7. The output 72*b* is coupled to the input/output 71*b* of the common filter section 71 via the output 7*c* of the first filter 7. The series arm resonators S21 to S24 are coupled in series between the input 72*a* and the output 72*b*. In the example in FIG. 1, the series arm resonators S21 to S24 are coupled in series, from the input 72*a* side to the output 72*b* side, in this order. The parallel arm resonators P21 and P22 are coupled in series between the node between the output 72*b* and the series arm resonator S21 and ground. The parallel arm resonators P22 and P24 are coupled in series between the node between the series arm resonators S22 and S23 and ground.

The additional filter section 72 limits the transmit signals inputted to the input 72*a* to signals within the pass band that includes the first communication band and passes the signals by using the series arm resonators S21 to S24 and the parallel arm resonators P21 to P24. The additional filter section 72 outputs the passed transmit signals from the output 72*b*.

The second filter 8 is a transmit filter having a communication frequency range that includes the transmit frequency range of the second communication band (for example, Band 3). The second communication band is different from the first communication band. The second filter 8 has an input 8*a* and an output 8*b*. The input 8*a* is coupled to the external terminal 5*d* via the power amplifier 25. The output 8*b* is coupled to the second terminal 6*b* of the first switch 6. The second filter 8 receives, through the input 8*a*, transmit signals outputted from the power amplifier 25, limits the input transmit signals to signals within the transmit frequency range of the second communication band and passes the signals, and outputs the passed transmit signals from the output 8*b*.

The second filter 9 is a receive filter having a communication frequency range that includes the receive frequency range of the second communication band (for example, Band 3). The second filter 9 has an input 9*a* and an output 9*b*. The input 9*a* is coupled to the second terminal 6*b* of the first switch 6. The output 9*b* is coupled to the external terminal 5*e* via the low-noise amplifier 26. The second filter 9 receives, through the input 9*a*, the receive signals outputted from the second terminal 6*b* of the first switch 6, limits the input receive signals to signals within the receive frequency range of the second communication band and passes the signals, and outputs the passed receive signals from the output 9*b*.

The power amplifier 10 is coupled between the external terminal 5*b* and the first filter 7. The power amplifier 10 has an input 10*a* and an output 10*b*. The input 10*a* is coupled to the external terminal 5*b*. The output 10*b* is coupled to the input 7*b* of the first filter 7 via the matching circuit 13. The power amplifier 10 amplifies the transmit signals inputted from the external terminal 5*b* to the input 10*a* and outputs the amplified transmit signals from the output 10*b* to the first filter 7.

The low-noise amplifier 11 is coupled between the output 7*c* (the node N1) of the first filter 7 and the external terminal 5*c*. The low-noise amplifier 11 has an input 11*a* and an output 11*b*. The input 11*a* is coupled to the output 7*c* of the first filter 7 via the matching circuit 14. The output 11*b* is coupled to the external terminal 5*c*. The low-noise amplifier 11 amplifies the receive signals inputted to the input 11*a* from the output 7*c* of the first filter 7 and outputs the amplified receive signals from the output 11*b* to the external terminal 5*c*.

The power amplifier 25 is coupled between the external terminal 5*d* and the second filter 8. The power amplifier 25 has an input 25*a* and an output 25*b*. The input 25*a* is coupled to the external terminal 5*d*. The output 25*b* is coupled to the input 8*a* of the second filter 8. The power amplifier 25 amplifies the transmit signals inputted from the external terminal 5*d* to the input 25*a* and outputs the amplified transmit signals from the output 25*b* to the second filter 8.

The low-noise amplifier 26 is coupled between the external terminal 5*e* and the second filter 9. The low-noise amplifier 26 has an input 26*a* and an output 26*b*. The input 26*a* is coupled to the output 9*b* of the second filter 9. The output 26*b* is coupled to the external terminal 5*e*. The low-noise amplifier 26 amplifies the receive signals inputted to the input 26*a* from the second filter 9 and outputs the amplified receive signals from the output 26*b* to the external terminal 5*e*.

The matching circuit 12 is coupled between the second terminal 6*b* of the first switch 6 and the first filter 7. The matching circuit 12 is a matching circuit for impedance matching between the first switch 6 and the first filter 7. The matching circuit 12 includes, for example, an inductor coupled between the signal path connecting the second terminal 6*b* of the first switch 6 to the input/output 7*a* of the first filter 7 and ground.

The matching circuit 13 is coupled between the power amplifier 10 and the additional filter section 72 of the first filter 7. The matching circuit 13 is a matching circuit for impedance matching between the power amplifier 10 and the additional filter section 72. The matching circuit 13 includes, for example, an inductor coupled in series between the power amplifier 10 and the additional filter section 72.

The matching circuit 14 is coupled between the low-noise amplifier 11 and the output 7*c* (the node N1) of the first filter 7. The matching circuit 14 is a matching circuit for impedance matching between the low-noise amplifier 11 and the common filter section 71 of the first filter 7. The matching circuit 14 includes, for example, an inductor coupled in series between the low-noise amplifier 11 and the output 7*c* of the first filter 7.

The controller 15 is operable to control the electronic components (for example, the first switch 6, the power amplifiers 10 and 25, and the low-noise amplifiers 11 and 26) included in the radio-frequency module 1, based on the control signals from the signal processing circuit 2. The controller 15 is electrically coupled to the electronic components. The controller 15 is also coupled to the signal output of the signal processing circuit 2 via the external terminal 5*f*. The controller 15 controls the electronic components based on the control signals inputted to the external terminal 5*f* from the signal processing circuit 2.

4. Operation of Radio-Frequency Module 1

4-1. Operation of First Filter 7

The first filter 7 can be used for both transmission and reception. The first filter 7 passes transmit signals and receive signals in TDD. In the first exemplary embodiment, the first filter 7 passes transmit signals and receive signals in the first communication band in TDD.

More specifically, when the first filter 7 performs TDD transmission operation (in other words, transmit filter operation), the power amplifier 10 is activated, while the low-noise amplifier 11 remains inactive. When the low-noise amplifier 11 is inactive, a specific internal switch of the low-noise amplifier 11 is turned off. As a result, the low-noise amplifier 11 is electrically isolated from the second signal path L2.

When the first filter 7 performs TDD transmission operation, the transmit signals outputted from the power amplifier 10 are passed through the matching circuit 13, the additional filter section 72 of the first filter 7, and the node N1 and the common filter section 71 in this order and output to the second terminal 6b of the first switch 6. In this case, since the low-noise amplifier 11 is inactive, the specific internal switch of the low-noise amplifier 11 is turned off, and as a result, the low-noise amplifier 11 is electrically isolated from the second signal path L2. This configuration prevents the flow of transmit signals from the node N1 to the low-noise amplifier 11 side.

When the first filter 7 performs TDD reception operation (in other words, receive filter operation), the low-noise amplifier 11 is activated. When the first filter 7 performs TDD reception operation, the receive signals outputted from the second terminal 6b of the first switch 6 are passed through the common filter section 71 of the first filter 7, the node N1, and the low-noise amplifier 11 and output to the external terminal 5c. A switch (for example, a band selection switch) may be provided between the power amplifier 10 and the inductor 13 to electrically isolate the power amplifier 10 from the additional filter section 72 by turning off the switch when the first filter 7 performs TDD reception operation. This configuration prevents the flow of receive signals from the node N1 to the power amplifier 10 side.

4-2. Operation of Radio-Frequency Module 1 in Simultaneous Communications Involving First Communication and Second Communication The radio-frequency module 1 is able to simultaneously perform the first communication using the first communication band and the second communication using the second communication band. In the first communication, transmission of transmit signals in the first communication band and reception of receive signals in the first communication band using the first filter 7 are performed in TDD as described above. In the second communication, transmission of transmit signals in the second communication band using the second filter 8 and reception of receive signals in the second communication band using the second filter 9 are performed in frequency division duplex (FDD).

More specifically, when the radio-frequency module 1 performs the first communication, the first terminal 6a of the first switch 6 continuously remains connected to both the second terminal 6b and the third terminal 6c. With this connection, the radio-frequency module 1 transmits transmit signals in the first communication band and receives receive signals in the first communication band using the first filter 7 in TDD as described above. More specifically, when the radio-frequency module 1 transmits transmit signals in the first communication band in TDD using the first filter 7, the transmit signals are input from the signal processing circuit 2 to the external terminal 5b. The transmit signals are subsequently transferred from the external terminal 5b through the power amplifier 10, the additional filter section 72, the common filter section 71, and the first switch 6 in this order, and consequently outputted from the antenna 3. When the radio-frequency module 1 receives receive signals in the first communication band in TDD using the first filter 7, the radio-frequency module 1 receives receive signals in the first communication band with the antenna 3. The receive signals are then transferred successively through the first switch 6, the common filter section 71 of the first filter 7, the node N1, and the low-noise amplifier 11 and output to the external terminal 5c.

When the radio-frequency module 1 performs the second communication, the first terminal 6a of the first switch 6 is connected to both the second terminal 6b and the third terminal 6c. When the radio-frequency module 1 transmits transmit signals in the second communication band in FDD using the second filter 8, the transmit signals are input from the signal processing circuit 2 to the external terminal 5d. The transmit signals are subsequently transferred from the external terminal 5d through the power amplifier 25, the second filter 8, and the first switch 6 in this order, and consequently outputted from the antenna 3. When the radio-frequency module 1 receives receive signals in the second communication band in FDD using the second filter 9, the radio-frequency module 1 receives receive signals in the second communication band with the antenna 3. The receive signals are subsequently transferred successively through the first switch 6, the second filter 9, and the low-noise amplifier 26 and output to the external terminal 5e.

4-3. Signal Phase Through Second Filters 8 and 9

In the radio-frequency module 1, the common filter section 71 is coupled between the additional filter section 72 and the first switch 6. As a result, the identical resonator KS1 at the first switch 6 side end of the first filter 7 (in other words, the first switch 6 side end of the common filter section 71) can be used for both transmission operation and reception operation in TDD using the first filter 7. This configuration suppresses impedance variations on the first filter 7 side between transmission operation and reception operation in TDD using the first filter 7, when observed from the second filters 8 and 9. Considering the case where the first communication using the first filter 7 (in other words, the first communication using the first communication band) and the second communication using the second filters 8 and 9 (in other words, the second communication using the second communication band) in FDD are simultaneously performed, the variation in the phase of the signals passing through the second filters 8 and 9 (signals in the second communication band) between transmission operation and reception operation in TDD using the first filter 7 can be reduced.

The identical matching circuit 12 between the common filter section 71 and the second terminal 6b of the first switch 6 is used for both transmission operation and reception operation in TDD using the first filter 7. This configuration also suppresses impedance variations on the first filter 7 side between transmission operation and reception operation in TDD using the first filter 7, when observed from the second filters 8 and 9. Considering the case where the first communication using the first filter 7 (in other words, the first communication using the first communication band) and the second communication using the second filters 8 and 9 (in other words, the second communication using the second communication band) in FDD are simultaneously performed, the variation in the phase of the signals passing through the second filters 8 and 9 (signals in the second communication band) between transmission operation and reception operation in TDD using the first filter 7 can also be reduced.

5. Effects

As described above, the radio-frequency module 1 according to the first exemplary embodiment is capable of simultaneously perform the first communication using the first communication band and the second communication using the second communication band. The radio-frequency module 1 includes the first switch 6, the first filter 7, the second filters 8 and 9, the power amplifier 10, and the low-noise amplifier 11. The first switch 6 has the first terminal 6a, the second terminal 6b, and the third terminal 6c. The first terminal 6a is coupled to the antenna terminal 5a. The second terminal 6b and the third terminal 6c can be connected to or disconnected from the first terminal 6a in a switchable manner. The first filter 7 is coupled to the second terminal 6b. The first filter 7 has a pass band that includes the first communication band. The second filters 8 and 9 are coupled to the third terminal 6c. The second filters 8 and 9 have pass bands that include the second communication band. The first filter 7 includes the common filter section 71 and the additional filter section 72. The common filter section 71 can be used for both transmission and reception. Transmit signals and receive signals can pass through the common filter section 71 in TDD. The additional filter section 72 can be used for either transmission or reception. The additional filter section 72 is coupled between the first amplifier, which is one of the power amplifier 10 and the low-noise amplifier 11, and the common filter section 71. The second amplifier, which is the other of the power amplifier 10 and the low-noise amplifier 11, is coupled to a second signal path L2. The second signal path L2 branches off from a first signal path L1 connecting between the common filter section 71 and the additional filter section 72. The common filter section 71 is coupled between the additional filter section 72 and the first switch 6.

In this configuration, the common filter section 71 is coupled between the additional filter section 72 and the first switch 6. As a result, the identical configuration element of the resonator KS1 at the first switch 6 side end of the first filter 7 (in other words, the first switch 6 side end of the common filter section 71) can be used for both transmission operation and reception operation in TDD using the first filter 7. This configuration suppresses impedance variations in the first filter 7 between transmission operation and reception operation in TDD using the first filter 7, when observed from the second filters 8 and 9 side. Considering the case where the first communication using the first filter 7 and the second communication using the second filters 8 and 9 are simultaneously performed, the variation in the phase of the signals passing through the second filters 8 and 9 (signals in the second communication band) between transmission operation and reception operation in TDD using the first filter 7 can be reduced. In other words, during simultaneous communications using the first filter 7 and the second filters 8 and 9, the amount of variation in the bandpass phase of the second filters 8 and 9 due to the state of the first filter 7 can be reduced.

The additional filter section 72 is not provided in the second signal path L2 (a receive path) that connects the common filter section 71 to the low-noise amplifier 11. With this configuration, it can be considered that the additional filter section 72 constitutes a portion of the transmit filter implemented by the first filter 7. In this case, the common filter section 71 solely serves as the receive filter implemented by the first filter 7. This configuration reduces the size of the radio-frequency module 1.

The additional filter section 72 is coupled between the power amplifier 10 and the common filter section 71. The low-noise amplifier 11 is coupled to the second signal path L2. With this configuration, the additional filter section 72 constitutes a portion of the first filter 7 that functions as the transmit filter. As a result, due to the additional filter section 72, a larger number of resonators can operate when the first filter 7 serves as a transmit filter than when the first filter 7 serves as a receive filter. Usually, transmit signals have more power and noise than receive signals. However, in such cases, the attenuation characteristic of the transmit filter can be adjusted to adequately attenuate noise in transmit signals.

The communication device 100 according to the first exemplary embodiment includes the radio-frequency module 1 and the signal processing circuit 2. The signal processing circuit 2 is coupled to the radio-frequency module 1. The signal processing circuit 2 is configured to process radio-frequency signals. With this configuration, the communication device 100 can be provided to achieve the effects of the radio-frequency module 1.

6. Modifications

The following describes modifications of the first exemplary embodiment. In the following description, the same constituent elements as the first exemplary embodiment are assigned the same reference numerals as in the first exemplary embodiment; descriptions of the same constituent elements are sometimes not repeated, focusing on features that differ from the first exemplary embodiment. The following modifications may also be implemented in combination.

6-1. First Modification

In the first exemplary embodiment, the power amplifier 10 is coupled to the additional filter section 72, and the low-noise amplifier 11 is coupled to the second signal path L2. The second signal path L2 branches off from the first signal path L1 connecting between the common filter section 71 and the additional filter section 72. In a first modification of the first exemplary embodiment, the low-noise amplifier 11 may be coupled to the additional filter section 72, and the power amplifier 10 may be coupled to the second signal path L2. In this case, the additional filter section 72 is coupled between the low-noise amplifier 11 and the common filter section 71, and the power amplifier 10 is coupled to the second signal path L2. In this case, the additional filter section 72 serves as a receive filter. This means that the additional filter section 72 is not limited to a transmit filter but may also be a receive filter. In this case, the additional filter section 72 is coupled to the low-noise amplifier 11.

6-2. Second Modification

In the example of the radio-frequency module 1 of the first exemplary embodiment, the second communication using the second communication band is performed in FDD. More specifically, in the example, transmission of transmit signals in the second communication band using the second filter 8 and reception of receive signals in the second communication band using the second filter 9 are performed in FDD. However, the second communication using the second communication band may be performed in TDD.

Second Exemplary Embodiment

A radio-frequency module 1 according to a second exemplary embodiment will be described with reference to FIG. 2. In the following description, the same constituent elements as the first exemplary embodiment are assigned the same reference numerals as in the first exemplary embodiment; descriptions of the same constituent elements are sometimes not repeated, focusing on features that differ from the first exemplary embodiment.

1. Configuration

Figure 2:
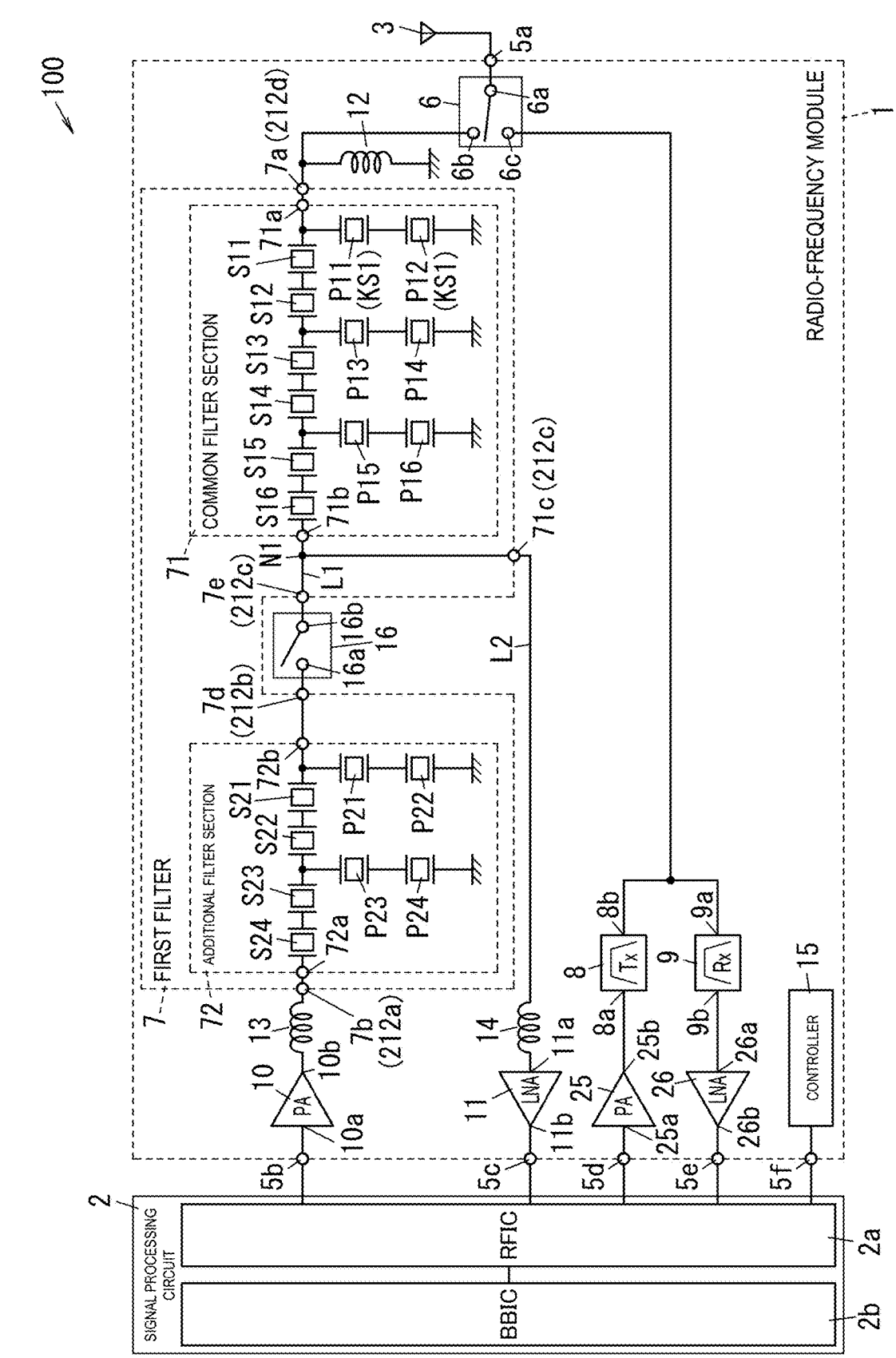
FIG. 2 illustrates a configuration of a radio-frequency module and a communication device according to a second exemplary embodiment.

As illustrated in FIG. 2, the radio-frequency module 1 according to the second exemplary embodiment is configured similarly to the radio-frequency module 1 of the first exemplary embodiment, except that the radio-frequency module 1 according to the second exemplary embodiment additionally includes a second switch 16.

The first filter 7 further includes an output 7d and an input 7e. The output 7d is configured to output output signals from the output 72b of the additional filter section 72 to the outside of the first filter 7 (to a terminal 16a of the second switch 16, which will be described later). The output 7d is coupled to the terminal 16a described later of the second switch 16. The output 7d is also coupled to the output 72b of the additional filter section 72. The input 7e is configured to input signals outputted from a terminal 16b described later of the second switch 16 to the inside of the first filter 7. The input 7e is coupled to the terminal 16b described later of the second switch 16. The input 7e is also coupled to the node N1 in the first filter 7.

The second switch 16 is coupled between the input 7e and the output 7d of the first filter 7 (in other words, between the node N1 and the additional filter section 72). The second switch 16 is operable to control connection and disconnection between the common filter section 71 and the additional filter section 72. The second switch 16 has the terminal 16a (a fourth terminal) and the terminal 16b (a fifth terminal). The terminal 16a is coupled to the output 7d of the first filter 7. The terminal 16b is coupled to the input 7e. The terminal 16b can be connected to or disconnected from the terminal 16a in a switchable manner.

When the first filter 7 performs TDD transmission operation (in other words, when the power amplifier 10 is activated), the terminals 16a and 16b of the second switch 16 are connected. As a result, when the first filter 7 performs TDD transmission operation, the output signals (transmit signals) from the power amplifier 10 are transferred successively through the additional filter section 72, the second switch 16, the node N1, the common filter section 71, and the first switch 6 and transmitted from the antenna 3.

When the first filter 7 performs TDD reception operation (in other words, when the power amplifier 10 is inactive), the terminals 16a and 16b of the second switch 16 are disconnected. As a result, the receive signals received by the antenna 3 are transferred successively through the first switch 6, the common filter section 71, the node N1, and the low-noise amplifier 11 and output to the external terminal 5c. At this time, because the terminals 16a and 16b of the second switch 16 are disconnected, the receive signals are prevented from flowing from the node N1 to the additional filter section 72 side.

2. Exemplary Double-Sided Mounting Architecture With Mounting Substrate

Figure 3:
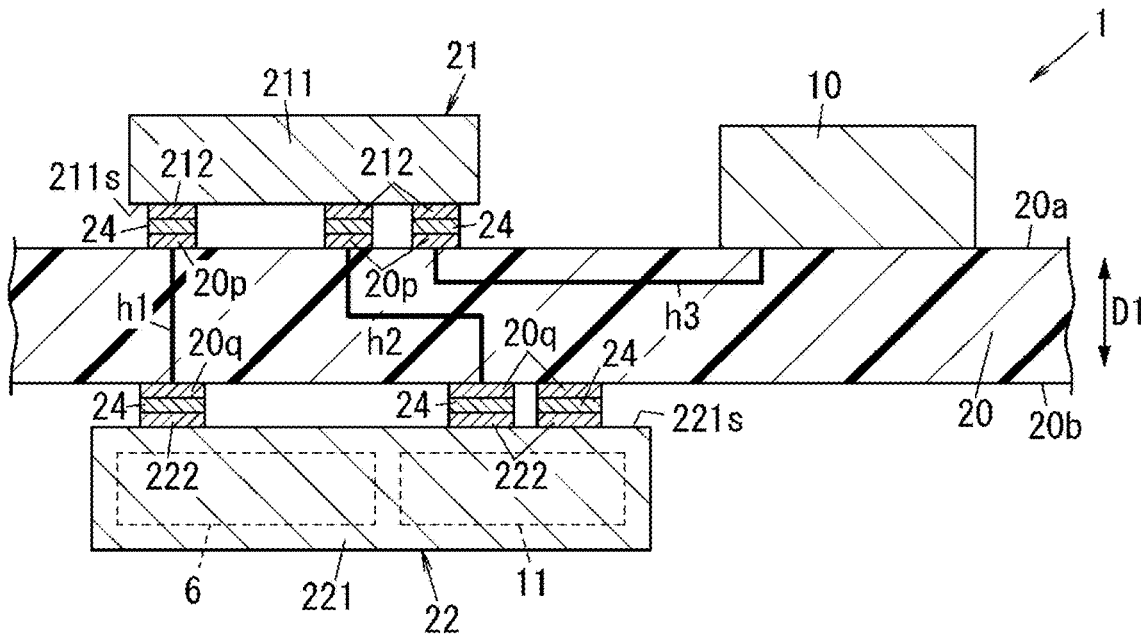
FIG. 3 is a sectional view illustrating a positional relationship between a first chip (a first filter) and a second switch in a second chip in the radio-frequency module.

As illustrated in FIG. 3, the radio-frequency module 1 further includes a mounting substrate 20 (a substrate), a first chip 21 (a chip), and a second chip 22.

The mounting substrate 20 is a substrate on which multiple electronic components included in the radio-frequency module 1 are mounted. The mounting substrate 20 is, for example, formed as a rectangular plate. The multiple electronic components include the first switch 6, the second switch 16, the first filter 7, the second filters 8 and 9, the power amplifier 10, 25, the low-noise amplifiers 11 and 26, the matching circuits 12 to 14, and the controller 15. In the second exemplary embodiment, the first filter 7 is formed by the first chip 21; the first switch 6, the second switch 16, and the low-noise amplifiers 11 and 26 are formed by the second chip 22. In the example in FIG. 3, only the first chip 21, the second chip 22, and the power amplifier 10 are illustrated among the multiple electronic components, and the other electronic components are not illustrated.

The mounting substrate 20 is a substrate (multilayer substrate) composed of multiple layers including multiple dielectric layers and multiple conductive layers. The multiple dielectric layers and the multiple conductive layers are stacked in a thickness direction D1 of the mounting substrate 20. The conductive layers are shaped in particular patterns designed for the respective conductive layers.

The mounting substrate 20 has a first major surface 20a and a second major surface 20b that are opposite to each other in the thickness direction D1 of the mounting substrate 20. Multiple pads 20p are provided on the first major surface 20a of the mounting substrate 20. Multiple pads 20q are provided on the second major surface 20b of the mounting substrate 20. Each pad 20p on the first major surface 20a is coupled to another pad 20p among the pads 20p on the first major surface 20a via an electrical path (that is, an electrical path formed by via electrodes and conductive layers) in the mounting substrate 20. Each pad 20p on the first major surface 20a is coupled to a pad 20q among the pads 20q on the second major surface 20b via an electrical path in the mounting substrate 20.

On the first major surface 20a of the mounting substrate 20, at least the first chip 21 and the power amplifier 10 among the multiple electronic components are disposed (mounted). On the second major surface 20b of the mounting substrate 20, at least the second chip 22 among the multiple electronic components is disposed (mounted). In the example in FIG. 3, as an example, only the first chip 21 and the power amplifier 10 are illustrated on the first major surface 20a of the mounting substrate 20, and only the second chip 22 is illustrated on the second major surface 20b of the mounting substrate 20.

The first chip 21 is an IC chip including the first filter 7. This means that the common filter section 71 and the additional filter section 72 of the first filter 7 are provided in an identical chip (the first chip 21). The first chip 21 is disposed (mounted) at a specific location on the first major surface 20a of the mounting substrate 20. The first chip 21 is, for example, formed as a rectangular plate in plan view.

The first chip 21 includes a chip body 211 and multiple electrodes 212. The chip body 211 is, for example, formed as a rectangular plate in plan view. The chip body 211 forms a portion of the first chip 21, specifically the portion excluding the electrodes 212. The electrodes 212 are provided on a surface 211S facing the mounting substrate 20 of the chip body 211. The electrodes 212 form the input/output 7a, the input 7b, the output 7c, the output 7d, and the input 7e of the first filter 7. Each electrode 212 is coupled to one of the pads 20p on the first major surface 20a of the mounting substrate 20 via a solder joint 24.

The second chip 22 is an IC chip that includes the first switch 6, the second switch 16, and the low-noise amplifiers 11 and 26. This means that the first switch 6, the second switch 16, and the low-noise amplifiers 11 and 26 are provided in an identical chip (the second chip 22). In FIG. 3, only the first switch 6 and low-noise amplifiers 11 and 26 are illustrated by dotted lines inside the second chip 22. The second chip 22 is disposed (mounted) at a specific location on the first major surface 20a of the mounting substrate 20. The second chip 22 is, for example, formed as a rectangular plate in plan view.

The second chip 22 includes a chip body 221 and multiple electrodes 222. The chip body 221 is, for example, formed as a rectangular plate in plan view. The chip body 221 forms a portion of the second chip 22, specifically the portion excluding the electrodes 222. The electrodes 222 are provided on a surface 221S facing the mounting substrate 20 of the chip body 221. The electrodes 222 include electrodes coupled to the first terminal 6a, the second terminal 6b, or the third terminal 6c of the first switch 6 or to the input 11a of the low-noise amplifier 11. Each electrode 222 is coupled to one of the pads 20q on the second major surface 20b of the mounting substrate 20 via a solder joint 24.

An electrode 212 of the first chip 21 is electrically coupled to an electrode 222 of the second chip 22 (for example, the electrode coupled to the second terminal 6b of the first switch 6) via a pad 20p provided on the first major surface 20a of the mounting substrate 20, an electrical path h1 inside the mounting substrate 20, and a pad 20q provided on the second major surface 20b of the mounting substrate 20. Another electrode 212 of the first chip 21 is electrically coupled to another electrode 222 of the second chip 22 (for example, the electrode coupled to the input 11a of the low-noise amplifier 11) via another pad 20p provided on the first major surface 20a of the mounting substrate 20, an electrical path h2 inside the mounting substrate 20, and another pad 20q provided on the second major surface 20b of the mounting substrate 20. Another electrode 212 of the first chip 21 is electrically coupled to the output 10b of the power amplifier 10 via another pad 20p on the first major surface 20a of the mounting substrate 20 and an electrical path h3 inside the mounting substrate 20.

3. Positional Relationship Between First Chip 21 and Second Switch 16 in Second Chip 22

The positional relationship between the first chip 21 and the second switch 16 in the second chip 22 in the thickness direction D1 of the mounting substrate 20 will be described with reference to FIG. 3.

As illustrated in FIG. 3, the first chip 21 is disposed (mounted) on the first major surface 20a of the mounting substrate 20. The second chip 22 is disposed on the second major surface 20b of the mounting substrate 20.

In the thickness direction D1 of the mounting substrate 20, the first chip 21 overlaps the first switch 6 inside the second chip 22. As used herein, the expression "the first chip 21 overlaps the first switch 6" refers to a situation where the first chip 21 coincides with at least a portion of the first switch 6 or a situation where at least a portion of first chip 21 coincides with the first switch 6. As described above, since the first chip 21 overlaps the first switch 6 in the thickness direction D1 of the mounting substrate 20, the electrical path h1 connecting between the first chip 21 and the first switch 6 is shortened. This layout reduces losses in the electrical path h1 connecting between the first chip 21 and the first switch 6.

4. Positional Relationship Among Electrodes 212 of First Chip 21

An arrangement of the electrodes 212 of the first chip 21 will be described with reference to FIG. 4.

As described above, the first chip 21 includes multiple (six in the example in FIG. 4) electrodes 212. As illustrated in FIG. 4, the six electrodes 212 include first to fourth electrodes 212a to 212d. The six electrodes 212 are arranged in a vertical and horizontal pattern on the surface 211s of the first chip 21.

Figure 4:
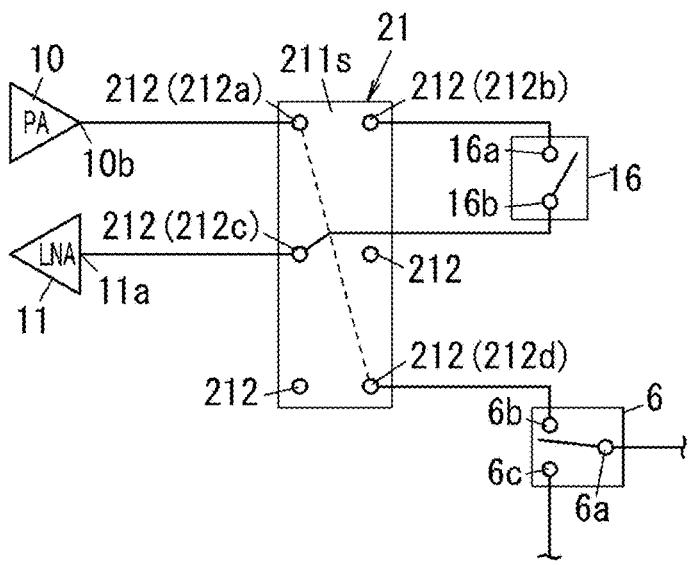
FIG. 4 illustrates a positional relationship among multiple electrodes of the first chip in the radio-frequency module.
Figure 5:
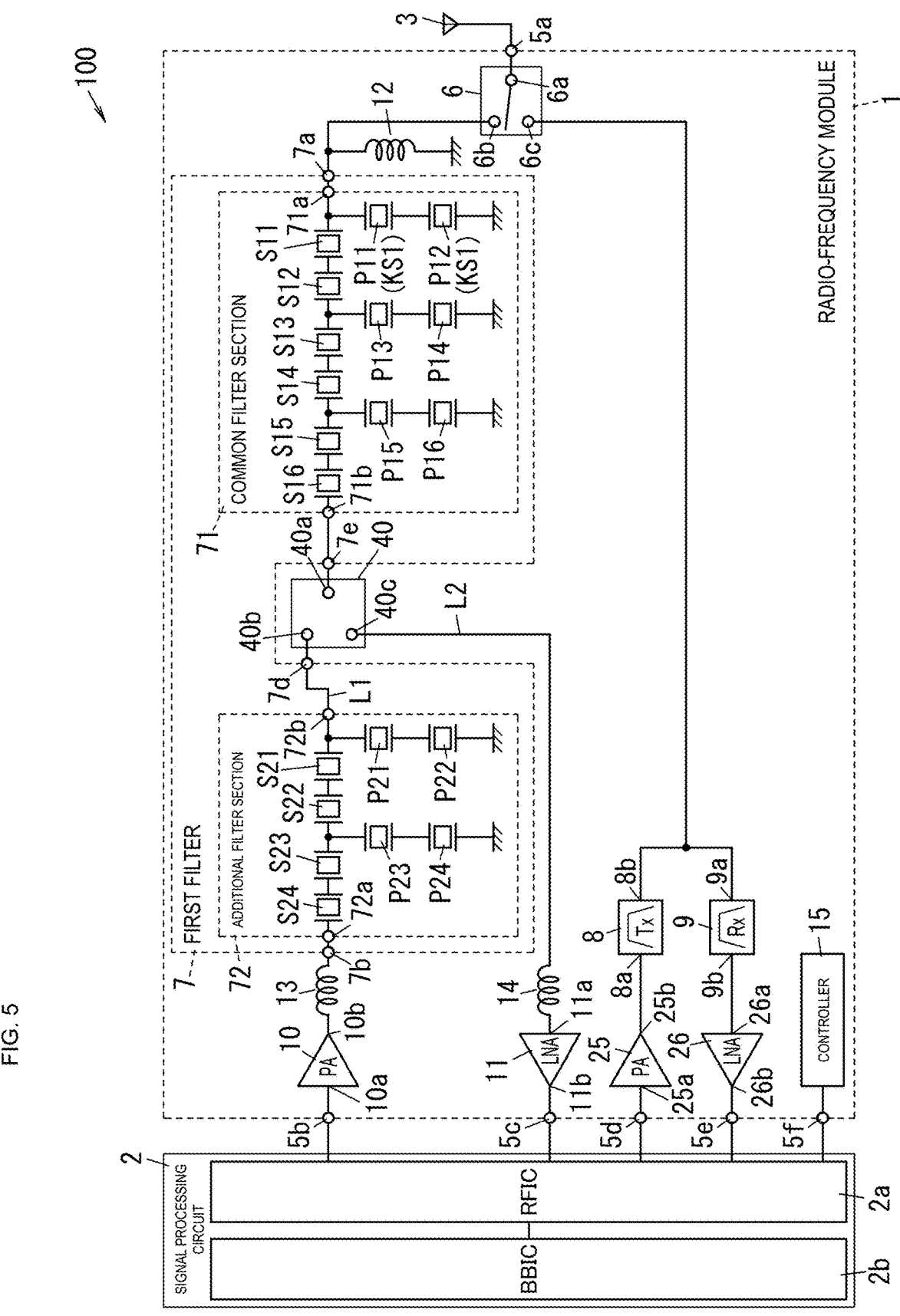
FIG. 5 illustrates a configuration of a radio-frequency module and a communication device according to a first modification of the second exemplary embodiment.

In the example in FIG. 4, as an example, the six electrodes 212 are arranged in three rows and two columns. The first electrode 212a is positioned at the first row and the first column. The second electrode 212b is positioned at the first row and the second column. The third electrode 212c is positioned at the second row and the first column. The fourth electrode 212d is positioned at the third row and the second column.

As indicated in FIG. 2, the first electrode 212a forms the input 7b of the first filter 7. The second electrode 212b forms the output 7d of the first filter 7. The third electrode 212c forms the output 7c and the input 7e of the first filter 7 in a combined manner. The fourth electrode 212d forms the input/output 7a of the first filter 7.

As illustrated in FIG. 4, the first electrode 212a is coupled to the output 10b of the power amplifier 10 via an electrical path. The second electrode 212b is coupled to the terminal 16a (a fourth terminal) of the second switch 16 via an electrical path. The third electrode 212c is coupled to the input 11a of the low-noise amplifier 11 via an electrical path. The fourth electrode 212d is coupled to the second terminal 6b of the first switch 6 via an electrical path. Each electrical path corresponds to an electrical path provided in the mounting substrate 20.

As illustrated in FIG. 4, when viewed in plan view in the thickness direction of the first chip 21 (that is, the thickness direction D1 of the mounting substrate 20), the second electrode 212b and the third electrode 212c are positioned between the first electrode 212a and the fourth electrode 212d in a direction M1 connecting the first electrode 212a to the fourth electrode 212d. This arrangement provides the common filter section 71 and the additional filter section 72 in the first chip 21 while also reducing the area of the first chip 21.

5. Effects

The radio-frequency module 1 according to the second exemplary embodiment further includes the second switch 16 in the radio-frequency module 1 according to the first exemplary embodiment. The second switch 16 is coupled between the node N1 of the first signal path L1 and the second signal path L2, and the additional filter section 72. The second switch 16 is operable to control connection and disconnection between the common filter section 71 and the additional filter section 72. With this configuration, by switching the second switch 16 to a disconnected state, the signals flowing through the common filter section 71, the node N1, and the second signal path L2 are prevented from partially flowing from the node N1 to the additional filter section 72 side. This configuration thus suppresses signal loss.

The common filter section 71 and the additional filter section 72 are provided in the identical chip 21. This configuration reduces the size of the radio-frequency module 1.

The radio-frequency module 1 further includes the mounting substrate 20 (a substrate) having the first major surface 20a and the second major surface 20b that are opposite to each other. The first chip 21 (a chip) is disposed on the first major surface 20a of the mounting substrate 20. The first switch 6 is disposed on the second major surface 20b of the mounting substrate 20. In the thickness direction D1 of the mounting substrate 20, the first chip 21 overlaps the first switch 6. This configuration shortens the electrical path h1 connecting between the first chip 21 and the first switch 6. This layout reduces losses in the electrical path h1 connecting between the first chip 21 and the first switch 6.

The second switch 16 has the terminal 16a (a fourth terminal) and the terminal 16b (a fifth terminal). The terminal 16a is coupled to the additional filter section 72. The terminal 16b is coupled to the node N1. The terminal 16b can be connected to or disconnected from the terminal 16a in a switchable manner. The first chip 21 includes the first electrode 212a, the second electrode 212b, the third electrode 212c, and the fourth electrode 212d. The first electrode 212a is coupled to the power amplifier 10 (a first amplifier). The second electrode 212b is coupled to the terminal 16a. The third electrode 212c is coupled to the terminal 16b. The fourth electrode 212d is coupled to the second terminal 6b of the first switch 6. When viewed in plan view in the thickness direction D1 of the first chip 21, the second electrode 212*b* and the third electrode 212*c* are positioned between the first electrode 212*a* and the fourth electrode 212*d* in a direction M1 connecting the first electrode 212*a* to the fourth electrode 212*d*. This arrangement provides the common filter section 71 and the additional filter section 72 in the first chip 21 while also reducing the area of the first chip 21.

6. Modifications

The following describes modifications of the second exemplary embodiment. In the following description, the same constituent elements as the second exemplary embodiment are assigned the same reference numerals as in the second exemplary embodiment; descriptions of the same constituent elements are sometimes not repeated, focusing on features that differ from the second exemplary embodiment. The following modifications may also be implemented in combination.

6-1. First Modification

In the radio-frequency module 1 according to a first modification of the second exemplary embodiment, the second switch 16 is replaced with a changeover switch 40 in the radio-frequency module 1 according to the second exemplary embodiment. In other words, the radio-frequency module 1 of the second modification of the second exemplary embodiment includes the changeover switch 40.

The changeover switch 40 is operable to selectively switch between the connection of the common filter section 71 and the additional filter section 72 and the connection of the common filter section 71 and the second signal path L2.

More specifically, the changeover switch 40 has a common terminal 40*a*, a first selection terminal 40*b*, and a second selection terminal 40*c*. The common terminal 40*a* can be selectively connected to either the first selection terminal 40*b* or the second selection terminal 40*c*. The common terminal 40*a* is coupled to the input 7*e* of the first filter 7. The first selection terminal 40*b* is coupled to the output 7*d* of the first filter 7. The second selection terminal 40*c* is coupled to the second signal path L2. In other words, the second selection terminal 40*c* is coupled to the input 11*a* of the low-noise amplifier 11 via the matching circuit 14.

In the first modification, the changeover switch 40 is provided in the first signal path L1 connecting between the input/output 71*b* of the common filter section 71 and the output 72*b* of the additional filter section 72. The second signal path L2 branches from the first signal path L1 via the changeover switch 40. As a result, in the first modification, the node N1 and the output 7*c* of the first exemplary embodiment are not provided.

In the first modification, when the first filter 7 performs TDD reception operation, the common terminal 40*a* is selectively connected to the second selection terminal 40*c* in the changeover switch 40. In other words, the changeover switch 40 disconnects the common filter section 71 from the additional filter section 72 and connects the common filter section 71 to the second signal path L2. As a result, the receive signals received by the antenna 3 are transferred through the first switch 6, the common filter section 71, the changeover switch 40, the matching circuit 14, and the low-noise amplifier 11 and output from the output terminal 5*c*. At this time, the changeover switch 40 prevents the receive signals from flowing from the common filter section 71 to the additional filter section 72 side.

When the first filter 7 performs TDD transmission operation, the common terminal 40*a* is selectively connected to the first selection terminal 40*b* in the changeover switch 40. In other words, the changeover switch 40 connects the common filter section 71 to the additional filter section 72 and disconnects the common filter section 71 from the second signal path L2. As a result, the output signals (transmit signals) from the power amplifier 10 are transferred through the additional filter section 72, the changeover switch 40, the common filter section 71, and the first switch 6 and output from the antenna 3. The changeover switch 40 prevents the transmit signals from flowing from the additional filter section 72 into the second signal path L2.

6-2. Second Modification

In the second exemplary embodiment, the first chip 21 is disposed on the first major surface 20*a* of the mounting substrate 20 (in other words, the major surface having the power amplifier 10). However, the first chip 21 may be disposed on the second major surface 20*b* of the mounting substrate 20. In this case, the first chip 21 may be positioned to overlap the power amplifier 10 in the thickness direction D1 of the mounting substrate 20. As used herein, the expression "the first chip 21 overlaps the power amplifier 10" refers to a situation where the first chip 21 coincides with at least a portion of the power amplifier 10 or a situation where at least a portion of first chip 21 coincides with the power amplifier 10.

6-3. Third Modification

In the second exemplary embodiment, the common filter section 71 and the additional filter section 72 are provided at the first major surface 20*a* of the mounting substrate 20 (in other words, at the same major surface). However, the common filter section 71 and the additional filter section 72 may be provided at different major surfaces of the mounting substrate 20. Specifically, the common filter section 71 may be provided at one of the first major surface 20*a* and the second major surface 20*b* of the mounting substrate 20, and the additional filter section 72 may be provided at the other of the first major surface 20*a* and the second major surface 20*b* of the mounting substrate 20. For example, the common filter section 71 may be provided at the first major surface 20*a* of the mounting substrate 20 (in other words, the major surface having the power amplifier 10), and the additional filter section 72 may be provided at the second major surface 20*b* of the mounting substrate 20.

6-4. Fourth Modification

In the second exemplary embodiment, the additional filter section 72 constitutes a portion of the transmit filter. In this case, the additional filter section 72 may be disposed between the power amplifier 10 and the common filter section 71 on the first major surface 20*a* of the mounting substrate 20. When the additional filter section 72 constitutes a portion of the transmit filter, the additional filter section 72 is coupled to the power amplifier 10 via an electrical path. By positioning the additional filter section 72 between the common filter section 71 and the power amplifier 10 as described above, the electrical path connecting the additional filter section 72 and the power amplifier 10 can be shortened.

Aspects

The present specification discloses the following aspects.

A radio-frequency module (1) according to a first aspect is configured to simultaneously perform first communication using a first communication band and second communication using a second communication band. The radio-frequency module (1) includes a first switch (6), a first filter (7), a second filter (8, 9), a power amplifier (10), and a low-noise amplifier (11). The first switch (6) has a first terminal (6*a*), a second terminal (6*b*), and a third terminal (6*c*). The first terminal 6*a* is coupled to an antenna terminal (5*a*). The second terminal (6*b*) and the third terminal (6*c*) are configured to be connected to or disconnected from the first terminal 6a in a switchable manner. The first filter (7) is coupled to the second terminal (6b). The first filter (7) has a pass band that includes the first communication band. The second filter (8, 9) is coupled to the third terminal (6c). The second filter (8, 9) has a pass band that includes the second communication band. The first filter (7) includes a common filter section (71) and an additional filter section (72). The common filter section (71) is configured for both transmission and reception. The common filter section (71) is configured to pass a transmit signal and a receive signal in time division duplex. The additional filter section (72) is configured for either transmission or reception. The additional filter section (72) is coupled between a first amplifier and the common filter section 71. The first amplifier is one of the power amplifier (10) and the low-noise amplifier (11). A second amplifier is the other of the power amplifier (10) and the low-noise amplifier (11). The second amplifier is coupled to a second signal path (L2) that branches off from a first signal path (L1) connecting between the common filter section (71) and the additional filter section (72). The common filter section (71) is coupled between the additional filter section (72) and the first switch (6).

In this configuration, the common filter section (71) is coupled between the additional filter section (72) and the first switch (6). As a result, the identical configuration element of a resonator (KS1) at the first switch (6) side end of the first filter (7) (in other words, the first switch (6) side end of the common filter section (71)) can be used for both transmission operation and reception operation in time division duplex (TDD) using the first filter (7). This configuration suppresses impedance variations in the first filter (7) between transmission operation and reception operation in TDD using the first filter (7), when observed from the second filter (8, 9) side. Considering the case where the first communication using the first filter (7) and the first communication using the second filter (8, 9) are simultaneously performed, the variation in the phase of the signals passing through the second filter (8, 9) (signals in the second communication band) between transmission operation and reception operation in TDD using the first filter (7) can be reduced. In other words, during simultaneous communications using the first filter (7) and the second filter (8, 9), the amount of variation in the bandpass phase of the second filter (8, 9) due to the state of the first filter (7) can be reduced.

The radio-frequency module (1) according to a second aspect, with respect to the first aspect, further includes a second switch (16). The second switch (16) is coupled between a node (N1) of the first signal path (L1) and the second signal path (L2), and the additional filter section (72). The second switch (16) is configured to control connection and disconnection between the common filter section (71) and the additional filter section (72).

With this configuration, by switching the second switch (16) to a disconnected state, the signals flowing through the common filter section (71), the node (N1), and the second signal path (L2) are prevented from partially flowing from the node (N1) to the additional filter section (72) side. This configuration thus suppresses signal loss.

In the radio-frequency module (1) according to a third aspect, with respect to the second aspect, the common filter section (71) and the additional filter section (72) are provided in an identical chip (21).

This configuration reduces the size of the radio-frequency module (1).

The radio-frequency module (1) according to a fourth aspect, with respect to the third aspect, further includes a substrate (20) having a first major surface (20a) and a second major surface (20b) that are opposite to each other. The chip (21) is disposed on the first major surface (20a). The first switch (6) is disposed on the second major surface (20b). In a thickness direction (D1) of the substrate (20), the first chip (21) overlaps the first switch (6).

This configuration shortens an electrical path (h1) connecting between the chip (21) and the first switch (6). This layout reduces losses in the electrical path (h1) connecting between the chip (21) and the first switch (6).

In the radio-frequency module (1) according to a fifth aspect, with respect to the third or fourth aspect, the second switch (16) has a fourth terminal (16a) and a fifth terminal (16b). The fourth terminal (16a) is coupled to the additional filter section (72). The fifth terminal (16b) is coupled to the node (N1). The fifth terminal (16b) is configured to be connected to or disconnected from the fourth terminal (16a) in a switchable manner. The chip (21) has a first electrode (212a), a second electrode (212b), a third electrode (212c), and a fourth electrode (212d). The first electrode (212a) is coupled to the first amplifier. The second electrode (212b) is coupled to the fourth terminal (16a). The third electrode (212c) is coupled to the fifth terminal (16b). The fourth electrode (212d) is coupled to the second terminal (6b) of the first switch (6). When viewed in plan view in the thickness direction (D1) of the chip (21), the second electrode (212b) and the third electrode (212c) are positioned between first electrode (212a) and the fourth electrode (212d) in a direction (M1) connecting the first electrode (212a) to the fourth electrode (212d).

This arrangement provides the common filter section (71) and the additional filter section (72) in the chip (21) while also reducing the area of the chip (21).

The radio-frequency module (1) according to a sixth aspect, with respect to the first aspect, includes a changeover switch (40). The changeover switch (40) is configured to selectively switch between the connection of the common filter section (71) and the additional filter section (72) and the connection of the common filter section (71) and the second signal path (L2).

With this configuration, the changeover switch (40) selectively couples the common filter section (71) to one of the additional filter section (72) and the second signal path (L2). This configuration prevents signals (transmit signals or receive signals) from flowing to the additional filter section (72) or the second signal path (L2) when the additional filter section (72) or the second signal path (L2) is not coupled to the common filter section (71).

In the radio-frequency module (1) according to a seventh aspect, with respect to any one of the first to sixth aspects, the additional filter section (72) is not provided in a receive path (L2) that connects the common filter section (71) to the low-noise amplifier (11).

With this configuration, it can be considered that the additional filter section (72) constitutes a portion of the transmit filter implemented by the first filter (7). In this case, the common filter section (71) solely serves as the receive filter implemented by the first filter (7). This configuration reduces the size of the radio-frequency module (1).

In the radio-frequency module (1) according to an eighth aspect, with respect to any one of the first to seventh aspects, the additional filter section (72) is coupled between the power amplifier (10) and the common filter section (71). The low-noise amplifier (11) is coupled to the second signal path (L2).

21

With this configuration, the additional filter section (72) constitutes a portion of the first filter (7) that functions as a transmit filter. As a result, due to the additional filter section (72), a larger number of resonators can operate when the first filter (7) serves as a transmit filter than when the first filter (7) serves as a receive filter. As a result, the transmit filter frequency characteristic can be designed more easily than the receive filter frequency characteristic.

A communication device (100) according to a ninth aspect includes the radio-frequency module (1) according to any one of the first to eighth aspects and a signal processing circuit (2). The signal processing circuit (2) is coupled to the radio-frequency module (1). The signal processing circuit (2) is configured to process a radio-frequency signal.

With this configuration, the communication device (100) can be provided to achieve the effects of the radio-frequency module (1).

What is claimed is:

1. A radio-frequency module for simultaneously performing first communication using a first communication band and second communication using a second communication band, the radio-frequency module comprising:
a first switch having a first terminal that is coupled to an antenna terminal, and a second terminal and a third terminal that are configured to be connected to or disconnected from the first terminal in a switchable manner;
a first filter coupled to the second terminal, the first filter having a pass band that includes the first communication band;
a second filter coupled to the third terminal, the second filter having a pass band that includes the second communication band;
a power amplifier; and
a low-noise amplifier, wherein
the first filter includes
a common filter circuit configured to both transmit and receive, the common filter circuit being configured to pass a transmit signal and a receive signal in time division duplex, and
an additional filter circuit configured to either transmit or receive,
the additional filter circuit is coupled between a first amplifier and the common filter circuit, and the first amplifier is one of the power amplifier and the low-noise amplifier,
a second amplifier is another of the power amplifier and the low-noise amplifier, and the second amplifier is coupled to a second signal path that branches off from a first signal path connecting between the common filter circuit and the additional filter circuit, and
the common filter circuit is coupled between the additional filter circuit and the first switch.

2. The radio-frequency module according to claim 1, further comprising:
a changeover switch configured to selectively switch between connection of the common filter circuit and the additional filter circuit and connection of the common filter circuit and the second signal path.

3. The radio-frequency module according to claim 1, wherein
the additional filter circuit is not provided in a receive path connecting the common filter circuit to the low-noise amplifier.

4. The radio-frequency module according to claim 1, wherein

22 the additional filter circuit is coupled between the power amplifier and the common filter circuit, and
the low-noise amplifier is coupled to the second signal path.

5. A communication device comprising:
the radio-frequency module according to claim 1; and
a signal processing circuit coupled to the radio-frequency module, the signal processing circuit being configured to process a radio-frequency signal.

6. The communication device according to claim 5, wherein the signal processing circuit is configured to up-convert transmit signals and to down-convert receive signals.

7. The communication device according to claim 6, wherein the signal processing circuit is configured to output the receive signal after down-conversion.

8. The communication device according to claim 7, wherein the receive signal includes at least one of an image signal and an audio signal.

9. The communication device according to claim 8, wherein the transmit signal includes at least one of an image signal and an audio signal.

10. The radio-frequency module according to claim 1, further comprising:
a second switch coupled between the additional filter circuit and a node of the first signal path and the second signal path, the second switch being configured to control connection and disconnection between the common filter circuit and the additional filter circuit.

11. The radio-frequency module according to claim 10, wherein
the additional filter circuit is coupled between the power amplifier and the common filter circuit, and
the low-noise amplifier is coupled to the second signal path.

12. The radio-frequency module according to claim 10, wherein
the additional filter circuit is not provided in a receive path connecting the common filter circuit to the low-noise amplifier.

13. The radio-frequency module according to claim 10, wherein
the common filter circuit and the additional filter circuit are provided in a same chip.

14. The radio-frequency module according to claim 13, wherein
the second switch includes
a fourth terminal coupled to the additional filter circuit, and
a fifth terminal coupled to the node, the fifth terminal being configured to be connected to or disconnected from the fourth terminal in a switchable manner,
the chip includes
a first electrode coupled to the first amplifier,
a second electrode coupled to the fourth terminal,
a third electrode coupled to the fifth terminal, and
a fourth electrode coupled to the second terminal of the first switch, and
when viewed in plan view in a thickness direction of the chip, the second electrode and the third electrode are positioned between the first electrode and the fourth electrode in a direction connecting the first electrode to the fourth electrode.

15. The radio-frequency module according to claim 13, wherein
the additional filter circuit is coupled between the power amplifier and the common filter circuit, and the low-noise amplifier is coupled to the second signal path.

16. The radio-frequency module according to claim 13, wherein the additional filter circuit is not provided in a receive path connecting the common filter circuit to the low-noise amplifier.

17. The radio-frequency module according to claim 13, further comprising:

a substrate having a first major surface and a second major surface that is opposite to the first major surface, wherein the chip is disposed on the first major surface, the first switch is disposed on the second major surface, and the chip overlaps the first switch in a thickness direction of the substrate.

18. The radio-frequency module according to claim 17, wherein the second switch includes a fourth terminal coupled to the additional filter circuit, and a fifth terminal coupled to the node, the fifth terminal being configured to be connected to or disconnected from the fourth terminal in a switchable manner, the chip includes a first electrode coupled to the first amplifier, a second electrode coupled to the fourth terminal, a third electrode coupled to the fifth terminal, and a fourth electrode coupled to the second terminal of the first switch, and when viewed in plan view in a thickness direction of the chip, the second electrode and the third electrode are positioned between the first electrode and the fourth electrode in a direction connecting the first electrode to the fourth electrode.

19. The radio-frequency module according to claim 17, wherein the additional filter circuit is coupled between the power amplifier and the common filter circuit, and the low-noise amplifier is coupled to the second signal path.

20. The radio-frequency module according to claim 17, wherein the additional filter circuit is not provided in a receive path connecting the common filter circuit to the low-noise amplifier.

* * * * *